(12) United States Patent
Voss et al.

(10) Patent No.: US 8,444,094 B2
(45) Date of Patent: May 21, 2013

(54) HIGH LIFT SYSTEM FOR AN AIRCRAFT

(75) Inventors: Timo Voss, Hamburg (DE); Joachim Loerke, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 92 days.

(21) Appl. No.: 12/810,907

(22) PCT Filed: Dec. 29, 2008

(86) PCT No.: PCT/EP2008/011132
§ 371 (c)(1),
(2), (4) Date: Sep. 22, 2010

(87) PCT Pub. No.: WO2009/083255
PCT Pub. Date: Jul. 9, 2009

(65) Prior Publication Data
US 2011/0011984 A1    Jan. 20, 2011

Related U.S. Application Data

(60) Provisional application No. 61/017,277, filed on Dec. 28, 2007.

(30) Foreign Application Priority Data

Dec. 28, 2007 (DE) .......................... 10 2007 063 583

(51) Int. Cl.
*B64C 9/24* (2006.01)
(52) U.S. Cl.
USPC .......................................... 244/214
(58) Field of Classification Search
USPC ........................................ 244/210, 213, 214
See application file for complete search history.

(56) References Cited

U.S. PATENT DOCUMENTS 1,780,838 A * 11/1930 Handley .......................... 244/203
1,800,746 A * 4/1931 Handley .......................... 244/211
(Continued)

FOREIGN PATENT DOCUMENTS

DE 102007020870 A1 11/2008
WO 97/49607 A 12/1997
(Continued)

OTHER PUBLICATIONS

International Search Report for corresponding PCT application PCT/EP08/011132, dated Apr. 23, 2009.

(Continued)

*Primary Examiner* — Tien Dinh
*Assistant Examiner* — Michael A Fabula
(74) *Attorney, Agent, or Firm* — Matthew B. Dernier, Esq.; Gibson & Dernier LLP

(57) ABSTRACT

A high-lift system for an aircraft includes a main wing, a lift flap arranged on the main wing of the aircraft, which lift flap is adjustable, between a retracted position and several extended positions relative to the main wing of the aircraft, by means of a flap adjustment mechanism for coupling the lift flap to the main wing and by means of a drive device, wherein the flap adjustment mechanism comprises at least two adjustment devices arranged so as to be spaced apart from each other in the wingspan direction, with each adjustment device including a first lever and a second lever, where the first end piece of the second lever is pivotally and slidably held on the main wing, while the second end piece of said second lever is pivotally held on the lift flap.

10 Claims, 3 Drawing Sheets

U.S. PATENT DOCUMENTS

| | | | | |
|---|---|---|---|---|
| 1,830,122 A | * | 11/1931 | Milburn | 244/210 |
| 2,172,370 A | * | 9/1939 | Fahrney | 244/211 |
| 2,445,833 A | * | 7/1948 | Kraemer et al. | 244/216 |
| 2,563,453 A | * | 8/1951 | Briend | 244/216 |
| 2,600,527 A | * | 6/1952 | Gordon | 244/210 |
| 2,749,060 A | * | 6/1956 | Withington et al. | 244/214 |
| 2,779,555 A | * | 1/1957 | Danielson | 244/216 |
| 2,908,454 A | * | 10/1959 | De Wolff | 244/216 |
| 3,847,369 A | * | 11/1974 | Phillips et al. | 244/210 |
| 4,159,089 A | * | 6/1979 | Cole | 244/214 |
| 4,171,787 A | * | 10/1979 | Zapel | 244/219 |
| 4,189,121 A | * | 2/1980 | Harper et al. | 244/214 |
| 4,202,519 A | * | 5/1980 | Fletcher | 244/214 |
| 4,230,295 A | * | 10/1980 | Eppler | 244/213 |
| 4,262,868 A | * | 4/1981 | Dean | 244/214 |
| 4,471,927 A | * | 9/1984 | Rudolph et al. | 244/215 |
| 4,544,118 A | * | 10/1985 | Robinson | 244/225 |
| 4,585,192 A | * | 4/1986 | Clifford-Jones | 244/214 |
| 4,702,442 A | * | 10/1987 | Weiland et al. | 244/216 |
| 4,763,862 A | * | 8/1988 | Steinhauer et al. | 244/215 |
| 5,203,524 A | * | 4/1993 | Laceby et al. | 244/99.13 |
| 5,230,487 A | * | 7/1993 | Gartelmann et al. | 244/216 |
| 7,293,744 B2 | * | 11/2007 | Perez-Sanchez et al. | 244/211 |
| 8,186,630 B2 | * | 5/2012 | Jaggard | 244/214 |
| 2005/0040294 A1 | * | 2/2005 | Perez-Sanchez et al. | 244/215 |
| 2008/0169383 A1 | * | 7/2008 | Patzelt et al. | 244/216 |
| 2010/0084515 A1 | * | 4/2010 | Jaggard | 244/214 |
| 2010/0140414 A1 | * | 6/2010 | Beyer et al. | 244/214 |
| 2010/0155542 A1 | | 6/2010 | Heller | |

FOREIGN PATENT DOCUMENTS

| | | |
|---|---|---|
| WO | 03/008266 A | 1/2003 |
| WO | 2008/084260 A | 7/2008 |

OTHER PUBLICATIONS

International Preliminary Report for corresponding PCT application PCT/EP08/011132, dated Aug. 10, 2010.

* cited by examiner

HIGH LIFT SYSTEM FOR AN AIRCRAFT

CROSS REFERENCE TO RELATED APPLICATIONS

This application claims priority to PCT Application No. PCT/EP2008/011132, filed Dec. 29, 2008; which claims priority to German Patent Application No. DE 10 2007 063 583.6, filed Dec. 28, 2007, and claims the benefit to U.S. Provisional Patent Application No. 61/017,277, filed Dec. 28, 2007, the entire disclosures of which applications are hereby incorporated by reference.

BACKGROUND

The invention relates to a high-lift system for an aircraft.

A high-lift system for an aircraft is described in document WO 03/008266.

Leading-edge slats are presently moved, for example, along a guide track and are, for example, driven by means of a toothed rack. The shape of the guide track results from the aerodynamically optimised positioning definition of the slats. The guide track and the toothed rack are rigidly or pivotally connected to the slat and along their lengths run on several rollers. An integrated toothed gear arrangement is used for linear actuation by way of a corresponding counter gear-tooth arrangement. The latter has been implemented by the output side of a planetary gear arrangement, which in turn is provided with kinetic energy by way of the central torque shaft.

SUMMARY OF THE INVENTION

It is the object of the invention to create a high-lift system that is adaptable in an improved manner to aircraft requirements. In particular, it is the object of the invention to create a high-lift system by means of which it is possible, while largely maintaining the kinematic characteristics in terms of translation and rotation, for the required installation space to be able to be reduced so that the constructional limits relating to the front spar and other structural components are minimised.

This object is met by way of one or more embodiments disclosed and described herein.

According to the invention, a high-lift system for an aircraft is provided, comprising a main wing, a lift flap arranged on the main wing of the aircraft, which lift flap is adjustable, between a retracted position and several extended positions relative to the main wing of the aircraft, by means of a flap adjustment mechanism for coupling the lift flap to the main wing and by means of a drive device. The flap adjustment mechanism comprises at least two adjustment devices arranged so as to be spaced apart from each other in wingspan direction, each adjustment device comprising a first lever and a second lever. The first lever or the second lever is moved by the drive device between two final positions for adjustment of the lift flap.

Each adjustment device may include a first lever and a second lever, each of the first and second levers including a respective length between opposing end pieces thereof, where a first end piece of each of the two levers includes a rotational coupling to the main wing, and a second end piece of each of the two levers includes a rotational coupling to the lift flap. At least one of the adjustment devices may be arranged such that at least one of the rotational couplings (a displaceable rotational coupling) is free to rotate, and free to displace along a path, with respect to the main wing or the lift flap to which the displaceable rotational coupling is connected. A displacement guiding mechanism is positioned between the displaceable rotational coupling and the rotational coupling at the opposing end piece. The displacement guiding mechanism includes: (i) a pivot element in fixed position with respect to the main wing or the lift flap to which the displaceable rotational coupling is connected, and (ii) a longitudinal guide extending in a longitudinal direction along the length of the one of the first and second levers (a displaceable lever) to which the displaceable rotational coupling is connected. The pivot element is slidably engaged with the longitudinal guide such that the displaceable lever operates to rotate about the pivot element and displace as the pivot element slides with respect to the longitudinal guide.

In a further exemplary embodiment a first lever can be held by a first end piece on a rotary axis that is affixed on the main wing, and by a second end piece on a rotary axis that is are located stationary on the lift flap. In this arrangement the pivot mounting of the second end piece of the first lever is preferably situated upstream of the bearing arrangement of the second end piece of the second lever on the lift flap.

The bearing arrangement of an end piece of the second lever can, in particular, be implemented on the lift flap with a rotary axis that is affixed to the lift flap. Furthermore, the second lever, at a region that is spaced apart, in longitudinal direction of the lever, from the pivot mounting, can comprise the bearing arrangement vis-à-vis the main wing, which bearing arrangement comprises a fixed rotary axis on the main wing and permits displacement of the second lever relative to the rotary axis.

In this arrangement, furthermore, the second lever can be moved, by the drive device, between two final positions for adjustment of the lift flap.

The bearing arrangement on the first end piece of the second lever can be implemented by a pivot mounting and by a longitudinal guide comprising a guide path, wherein the rotary axis of the pivot mounting is held in the guide path.

By its end piece that is situated opposite the lift flap, the second lever can be pivotally coupled to an output lever of an actuator, wherein the longitudinal guide can be situated between the pivot mounting of the second lever on the lift flap and the coupling with the output lever.

The lift flap can, in particular, be a leading-edge slat.

BRIEF DESCRIPTION OF THE DRAWINGS

Below, exemplary embodiments of the invention are described with reference to the enclosed figures that show the following.

DETAILED DESCRIPTION OF THE INVENTION

Figure 1:
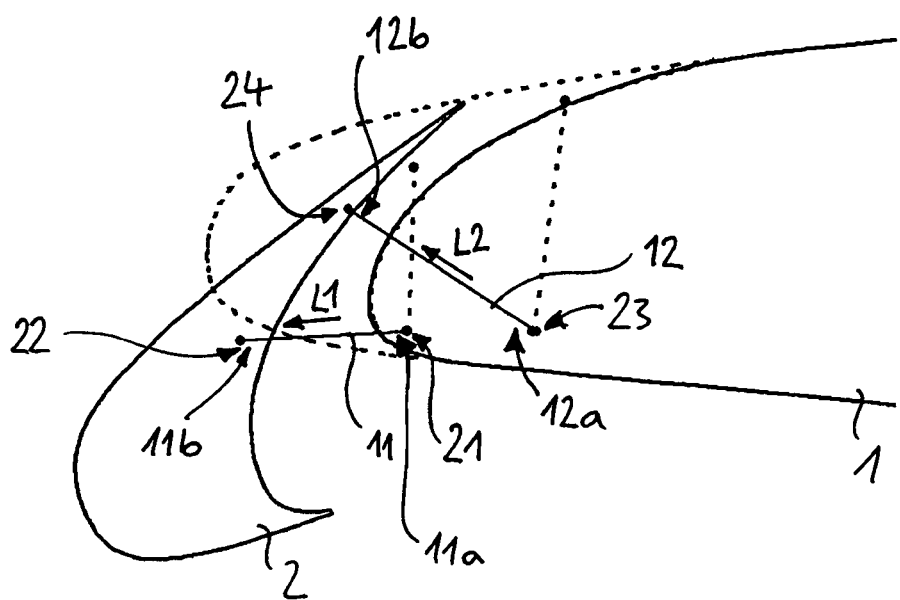
FIG. 1 a diagrammatic cross-sectional lateral view of the high-lift system according to the invention, with a first lever and a second lever, wherein the drive device is not shown, FIG. 2 a diagrammatic view of the functionality of the first lever, FIG. 3a a diagrammatic cross-sectional front view of the lever pair provided according to the invention, with a first lever and a second lever, wherein the drive device and the lift flap are not shown, FIG. 3b, based on the illustration in FIG. 3a, a diagrammatic cross-sectional view of the lever pair provided according to the invention, viewed across the direction of view shown in FIG. 3a, with a first lever and a second lever, wherein the drive device and the lift flap are not shown, FIG. 4 a diagrammatic basic layout of the functionality of a lever that is held so as to be longitudinally slidable according to the invention, FIG. 5 an exemplary embodiment of the lever according to FIG. 4, which lever is held so as to be longitudinally slidable.

The invention relates to the adjustment of high-lift devices in general, with its application being intended in particular for (leading-edge) slats but also for (trailing-edge) flaps, and relates in particular to a high-lift system for an aircraft, comprising a main wing 1, a lift flap 2 arranged on the main wing 1 of the aircraft, which lift flap 2 is adjustable, relative to the main wing 1 of the aircraft, by means of a flap adjustment mechanism for coupling the lift flap 2 to the main wing 1 and to a drive device between a retracted position and several extended positions.

The flap adjustment mechanism 5 comprises at least two adjustment devices arranged so as to be spaced apart from each other in the wingspan direction S, with each adjustment device comprising a first lever 11 and a second lever 12.

According to the invention, generally speaking, a first end piece 11a, 12a of one of the two levers 11, 12 is rotatably held on the main wing 1, while a second end piece 11b, 12b of said lever is held on the lift flap 2 in such a manner that the rotary axes of the bearing arrangements of the said one of the two levers 11, 12 are affixed on the main wing 1 or on the lift flap 2. Furthermore, the respective other lever 12, 11 is rotatably held, by an end piece, on the main wing 1 or on the lift flap 2, with a rotary axis that is stationary (affixed) on the respective end-piece 11a, 12a and on the main wing 1 or on the lift flap 2, and in a region that is spaced apart in longitudinal direction L2, L1 from the pivot mounting comprises a bearing arrangement vis-à-vis the respective other part comprising the pair comprising the lift flap 2 and the main wing 1, which bearing arrangement provides for a fixed rotary axis on the other part of the pair comprising the lift flap 2 and the main wing 1, and that allows displacement of the respective other lever relative to the rotary axis. In this arrangement the rotary axis can be arranged on the lever or on the main wing 1 or on the lift flap 2.

In the exemplary embodiment shown in FIG. 1 the first lever 11 is rotatably held by its first end piece 11a on the main wing 1, and by its second end piece 11b is rotatably held on the lift flap 2. Furthermore, in this exemplary embodiment the second lever by its first end piece 12a is pivotally held on the main wing 1, and by its second end piece 12b is pivotally held to the lift flap 2, wherein the second lever 12 by its second end piece 12b is held on the lift flap 2 in such a manner that the rotary axis of the bearing arrangement is provided so as to be affixed to the lift flap 2. At another position the second lever 12 comprises a bearing arrangement vis-à-vis the main wing 1, which bearing arrangement provides for a fixed rotary axis on the main wing 1 and allows displacement of the respective other lever relative to the rotary axis.

In an exemplary embodiment of the invention (FIG. 5) the pivot mounting of the second end piece 12b of the second lever 12 is situated upstream of the pivot mounting of the first end piece 12a of the second lever 12, and the second end piece 12b of the second lever 12 by means of a longitudinal guide 40 and a pivot mounting 43 comprises a rotary axis 45. In this arrangement the rotary axis 45 is affixed on the main wing 1 and is slidably received by a guide path 41 of the longitudinal guide 40. In this exemplary embodiment the first end piece 12a of the second lever 12 is coupled to a drive device 30.

By means of the slidably held second end piece of the first lever 11 or of the second lever 12, the "swinging bar concept", according to the invention, of the flap adjustment mechanism 5 is thus implemented.

Apart from the first or second lever, one or several more levers can be provided on an adjustment device 5, which levers are pivotally held on the main wing and on the lift flap. In this arrangement at least one lever of the at least one further lever can also be held by one of its end pieces so as to be additionally slidable relative to a rotary axis arranged on the main wing 1 or on the lift flap 2.

In the exemplary embodiment of FIG. 1 the use of two levers for each adjustment device with a total of four pivot joints 21, 22, 23, 24 is provided. In FIG. 1 the dashed contour shows the lift flap 2 in its retracted state, i.e. right up against the main wing 1. Furthermore, a solid line shows said lift flap 2 in an extended state that may be the landing position. Analogously the adjustment levers 11 and 12 are shown in dashed lines in their state in which they hold the lift flap 2 in its retracted state, and as solid lines in the extended state in which they hold the lift flap 2 in its extended state.

The second lever 12, whose first end piece 12a is pivotally and slidably held on the main wing 1 and whose second end piece 12b is pivotally held on the lift flap 2, is moved by the drive device 30 between two rotary positions for adjustment of the lift flap 2. In this arrangement the second lever 12 is driven, while the other lever(s) is(are) merely slaved.

Figure 2:
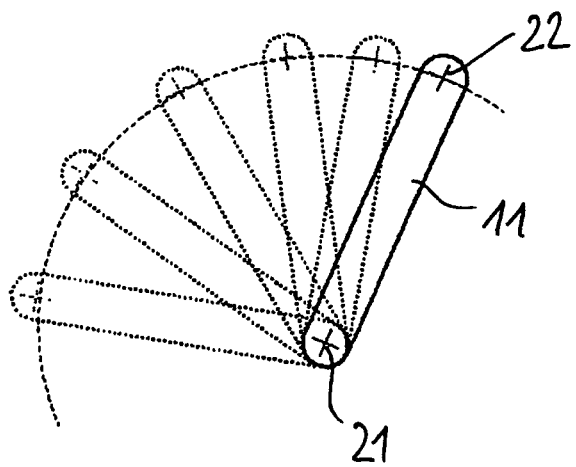
Figure 5:
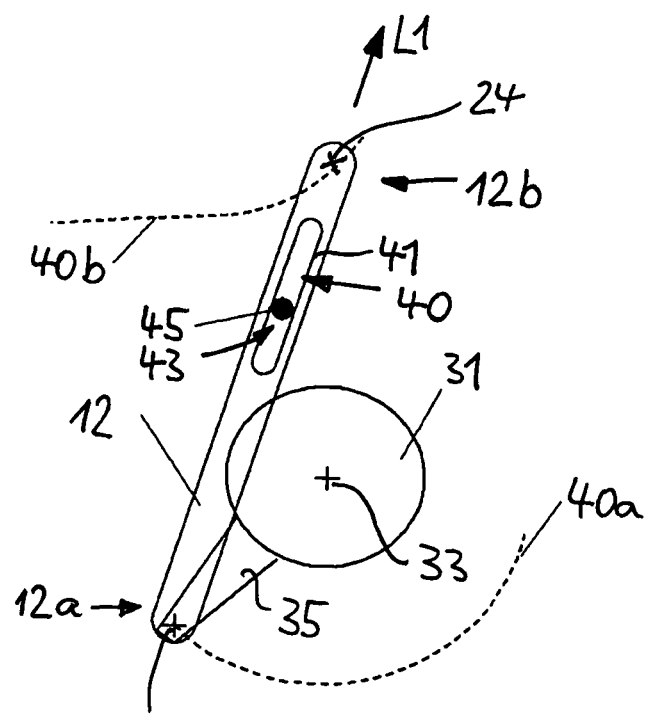

In an exemplary embodiment of the drive device 30 the latter can be a rotary gear arrangement which in turn is driven by way of a drive shaft 31. The tops and base points of both (or all) levers are to be provided depending on the application. In the embodiment shown in FIG. 2 the base point or the first end piece 11a of the first lever 11 is non-pivotally held in the structure of the main wing 1, and consequently the second end piece 11b of the first lever 11 moves along a circular path (FIG. 2). The diagram in FIG. 5 shows that according to the invention, depending on a given application, any movement paths of the end pieces of the levers can be generated. FIG. 5 shows a movement path 40a of the first end piece 12a and a movement path 40b of the second end piece 12b of the second lever 12.

Figure 3A:
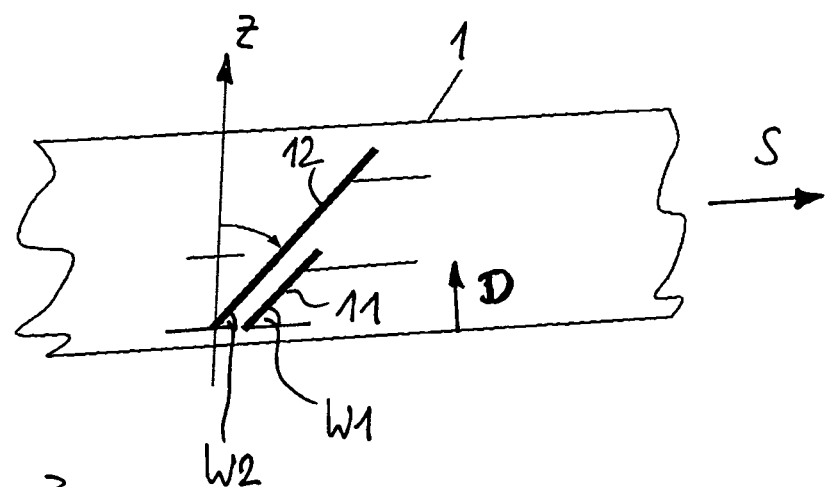
Figure 3B:
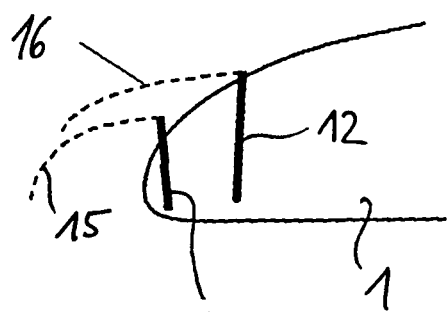
Figure 4:
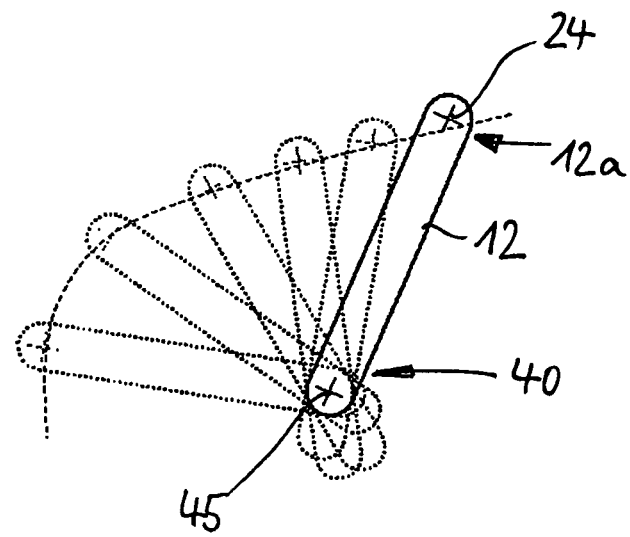

The lever length and thus the maximum possible translatory movement of the slat are in principle limited by the local thickness of the wing profile because the levers 11, 12 must not protrude from the contour. In order to work around this limitation the system can be designed in such a way that the levers 11, 12 do not move in a plane, and in particular do not move in the plane created by the wing thickness direction D and the wing depth direction. FIGS. 3a and 3b show a design of the high-lift system in which the rotary axes, provided according to the invention, of the first and of the second lever 11, 12 extend at an angle in relation to the wingspan direction S of the main wing 1 and in particular in an angular range of 45 degrees±20 degrees relative to the wingspan direction S of the main wing 1. In relation to the rotary axes provided on the lift flap 2, this angular range applies with the lift flap 2 retracted. This means that the rotary planes of the levers 11, 12 are inclined relative to the plane created by the vertical axis Z of the aircraft and by the longitudinal axis (not shown) of the aircraft.

The diagrams in FIGS. 1 to 5 show planar sections of movements of the levers 11, 12, which movements according to the invention are generally to be described with reference to the three wing axes (wingspan direction S, wing thickness direction D, wing depth direction).

In another exemplary embodiment the longitudinal directions of the levers 11, 12 in the retracted state of the lift flap 2, when viewed from the front, i.e. in the wing depth direction, extend at an angular range of 45 degrees±20 degrees relative to the wing thickness direction D of the main wing 1. These angles W1, W2 of both (or of all) levers 11, 12 can be identical or they can be different.

Likewise, it is by no means mandatory for the system of adjustment levers 11, 12 to be arranged so as to be perpendicular to the leading edge. The movement characteristics of the top points of the levers 11, 12, when viewed in the perpendicular projection plane parallel to the airflow, thus resembles an ellipse 15 or 16 whose half-axis ratio depends directly on the angle of inclination W1 or W2 (FIGS. 3a, 3b). By providing angles of inclination W1 or W2 that are optimal to the particular case of application, in particular by providing larger angles of inclination above 45 degrees, with modest requirements for installation space it is nevertheless possible to implement a relatively large translation movement of the lift flap 2.

According to the invention it is provided for the second lever 12 at its first end piece 12a to be pivotally and slidably held on the main wing 1, so that by allowing a displacement of the first end piece 12a during adjustment of the second lever 12 the adjustment mechanism is expanded by the degree of freedom of a slidable lever base point.

The lever whose one end piece is slidably held on the end piece that is situated opposite the slidably held end piece thus describes a tumbling movement during which the lever top no longer travels along a circular path but along some other path that can be adjusted according to the arrangement of the various bearing arrangements. The kinematics of adjustment of the lift flap can thus be implemented as desired. Consequently the curve of the path of the lift flap 2 or of the slat can be adjusted far better to the aerodynamically optimised positioning definition.

FIG. 5 shows an exemplary embodiment of a coupling of one of the levers with a drive device 30, which in this exemplary embodiment is implemented by a rotary gear arrangement 31 that is driven by a drive motor by way of a drive shaft 33. The second lever 12, which in this exemplary embodiment is coupled to the lift flap 2, which second lever 12 by its second end 12b is held so as to be longitudinally slidable by means of a slide guide 40, is on the one hand pivotally coupled to the output lever 35 of the rotary gear arrangement 31, and on the other hand is slidably held on a bearing that is affixed to the structure. The end piece 12a of the first lever 12 thus travels along a circular path 40a, while the lever top travels along a curve 40b, which as a result of the geometric arrangement can to a large extent be adjusted as desired.

The exemplary embodiments which with reference to FIG. 5 relate to the second lever can alternatively also be provided in relation to the first lever.

The invention provides an integratable actuation concept for high-lift elements on the leading edge of a wing or the trailing edge of a wing, which concept is able to solve the problem of limited design space in an adequate manner, wherein at the same time the system requirements concerning rotation and translation of the particular high-lift flap can be met.

The invention claimed is:

1. A high-lift system for an aircraft, comprising:
a main wing,
a lift flap,
a flap adjustment mechanism operating to couple the lift flap to the main wing of the aircraft, such that the lift flap is adjustable, between a retracted position and several extended positions relative to the main wing of the aircraft, and
a drive device operating to actuate the flap adjustment mechanism, wherein:
the flap adjustment mechanism comprises at least two adjustment devices arranged so as to be spaced apart from each other in a wingspan direction of the main wing,
each adjustment device comprises a first lever and a second lever, each of the first and second levers including a respective length between opposing end pieces thereof, where a first end piece of each of the two levers includes a rotational coupling to the main wing, and a second end piece of each of the two levers includes a rotational coupling to the lift flap,
at least one of the at least two adjustment devices being arranged such that at least one of the rotational couplings is a displaceable rotational coupling which is free to rotate and free to displace along a path with respect to the main wing or the lift flap, and
the flap adjustment mechanism further comprises a displacement guiding mechanism positioned between the displaceable rotational coupling and the rotational coupling at the opposing end piece, and including:
(i) a pivot element in fixed position with respect to the main wing or the lift flap to which the displaceable rotational coupling is connected, and
(ii) a guide extending in a longitudinal direction on one of the first and second levers, wherein one of the first and second levers is a displaceable lever,
wherein, the pivot element is slidably engaged with the longitudinal guide such that the displaceable lever rotates about the pivot element and displaces as the pivot element slides with respect to the longitudinal guide.

2. The high-lift system according to claim 1, wherein the drive device:
is fixed in position with respect to the main wing or the lift flap to which the displaceable rotational coupling is connected, and is rotationally connected to the displaceable rotational coupling of the displaceable lever.

3. The high-lift system according to claim 2, wherein the drive device includes a rotating output lever having:
a pivoting end, and
a sweeping end;
wherein, the sweeping end is rotationally connected to the displaceable rotational coupling of the displaceable lever and operates to move the displaceable rotational coupling along a predetermined circular path.

4. The high-lift system according to claim 3, wherein the drive device operates to move the displaceable lever, between at least two positions for adjustment of the lift flap.

5. The high-lift system according to claim 1, wherein the longitudinal guide includes a slot and the pivot element slides within the slot.

6. The high-lift system according to claim 3, wherein, the drive device includes an actuator operating to rotationally drive the pivoting end of the output lever.

7. The high-lift system according to claim 1, wherein the lift flap is a leading-edge slat.

8. The high-lift system according to claim 1, wherein the displaceable lever is provided such that the first end piece is rotationally coupled to the main wing by the displaceable rotational coupling and the second end piece is rotationally coupled to the lift flap.

9. The high-lift system according to claim 8, wherein the pivot element is fixed in position relative to the main wing.

10. A high-lift system for an aircraft, comprising:
a main wing,
a lift flap, and
a flap adjustment mechanism operating to couple the lift flap to the main wing of the aircraft, such that the lift flap is adjustable between a retracted position and several extended positions relative to the main wing of the aircraft, wherein, the flap adjustment mechanism comprises at least one adjustment device arranged on the main wing, the at least one adjustment device comprises a first lever and a second lever, each of the first and second levers including a respective length between opposing end pieces thereof, where a first end piece of each of the two levers includes a rotational coupling to the main wing, and a second end piece of each of the two levers includes a rotational coupling to the lift flap, the at least one adjustment device being arranged such that at least one of the rotational couplings is a displaceable rotational coupling which is free to rotate and free to displace along a path with respect to the main wing or the lift flap, and the flap adjustment mechanism further comprises a displacement guiding mechanism positioned between the displaceable rotational coupling and the rotational coupling at the opposing end piece, and including:

(i) a pivot element in fixed position with respect to the main wing or the lift flap to which the displaceable rotational coupling is connected, and (ii) a guide extending in a longitudinal direction on one of the first and second levers, wherein one of the first and second levers is a displaceable lever;

wherein, the pivot element is slidably engaged with the longitudinal guide such that the displaceable lever rotates about the pivot element and displaces as the pivot element slides with respect to the longitudinal guide.

* * * * *